(12) United States Patent
Pazhyannur et al.

(10) Patent No.: US 12,556,444 B2
(45) Date of Patent: Feb. 17, 2026

(54) SYSTEMS AND METHODS FOR MAPPING INDOOR USER MOVEMENT USING A COMBINATION OF WI-FI AND 60 GHz SENSING

(71) Applicant: Cisco Technology, Inc., San Jose, CA (US)

(72) Inventors: Rajesh S. Pazhyannur, Fremont, CA (US); Anand Oswal, Pleasanton, CA (US); Arun G. Khanna, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 17/645,135

(22) Filed: Dec. 20, 2021

(65) Prior Publication Data

US 2022/0116272 A1 Apr. 14, 2022

Related U.S. Application Data

(63) Continuation of application No. 16/878,813, filed on May 20, 2020, now Pat. No. 11,218,365.

(Continued)

(51) Int. Cl.
*H04L 41/0806* (2022.01)
*H04W 4/029* (2018.01)
(Continued)

(52) U.S. Cl.
CPC ......... *H04L 41/0806* (2013.01); *H04W 4/029* (2018.02); *H04W 76/10* (2018.02); *H04W 84/12* (2013.01)

(58) Field of Classification Search
CPC ..... H04W 12/06; H04W 12/08; H04W 12/68; H04W 12/30; H04W 12/33; H04W 12/065; H04W 88/08; H04W 88/02; H04W 12/12; H04W 4/40; H04W 12/72; H04W 4/38; H04W 12/79; H04W 24/08; H04W 12/02; H04W 12/062; H04W 12/65; H04W 4/027; H04W 12/104; H04W 12/03;

(Continued)

(56) References Cited

U.S. PATENT DOCUMENTS 9,141,150 B1 * 9/2015 Trundle ................. G06F 3/017
9,155,030 B2 10/2015 Chhabra et al.
(Continued)

*Primary Examiner* — Kwasi Karikari
(74) *Attorney, Agent, or Firm* — Baker Botts L.L.P.

(57) ABSTRACT

The present disclosure is directed to mapping indoor user movement using a combination of Wi-Fi and 60 GHz sensing. The methods include detecting, via a Wi-Fi access point, a wireless device associated with a first user, wherein the Wi-Fi access point is configured to determine location information and a device signature associated with the wireless device; transmitting the location information of the wireless device to a 11ay sensor; detecting the first user, via the 11ay sensor, based on the location information of the wireless device; creating a user signature associated with the first user, wherein the user signature is based on one or more physical characteristics of the first user detected by the 11ay sensor; and using the device signature associated with the wireless device and the user signature associated with the first user to subsequently identify the first user.

20 Claims, 4 Drawing Sheets

Related U.S. Application Data

(60) Provisional application No. 62/914,177, filed on Oct. 11, 2019.

(51) Int. Cl.
*H04W 76/10* (2018.01)
*H04W 84/12* (2009.01)

(58) Field of Classification Search
CPC ..... H04W 12/10; H04W 12/69; H04W 12/71; H04W 4/025; H04W 4/14; H04W 4/80; H04W 4/029; H04W 84/18; H04W 4/021; H04W 64/00; H04W 84/12; H04W 4/02
See application file for complete search history.

(56) References Cited

U.S. PATENT DOCUMENTS

| | | |
|---|---|---|
| 9,300,368 B2 | 3/2016 | Hansen et al. |
| 9,369,188 B2 | 6/2016 | Li et al. |
| 9,979,452 B2 | 5/2018 | Park et al. |
| 10,129,758 B2 | 11/2018 | Cordeiro et al. |
| 10,249,116 B1 | 4/2019 | Nagpal et al. |
| 10,284,382 B2 | 5/2019 | Anka |
| 11,310,105 B2 | 4/2022 | Pazhyannur et al. |
| 2007/0136792 A1* | 6/2007 | Ting .................. G06F 21/32 726/5 |
| 2015/0221151 A1* | 8/2015 | Bacco ................ H04L 9/3231 340/5.83 |
| 2015/0341756 A1 | 11/2015 | Heshmati et al. |
| 2017/0019722 A1 | 1/2017 | Ghosh et al. |
| 2017/0230363 A1* | 8/2017 | Deutschmann ..... H04W 12/065 |
| 2017/0230812 A1 | 8/2017 | Gehrling et al. |
| 2017/0302349 A1 | 10/2017 | Sun et al. |
| 2017/0373903 A1 | 12/2017 | Shimodaira et al. |
| 2018/0121640 A1* | 5/2018 | Turgeman ............ G06F 3/017 |
| 2018/0322351 A1* | 11/2018 | Shaker .............. G06V 40/1312 |
| 2018/0353086 A1* | 12/2018 | Turner .................. G01S 13/50 |
| 2019/0007964 A1 | 1/2019 | Park et al. |
| 2019/0037595 A1* | 1/2019 | Cherian ............. H04W 74/006 |
| 2019/0107566 A1* | 4/2019 | Lachica ............. G01R 29/0892 |
| 2019/0142305 A1 | 5/2019 | Tan |
| 2020/0005809 A1 | 1/2020 | Ottogalli et al. |
| 2020/0137608 A1 | 4/2020 | Wright et al. |
| 2020/0244653 A1 | 7/2020 | Eichelberger et al. |
| 2020/0275241 A1 | 8/2020 | Levy et al. |
| 2020/0275402 A1 | 8/2020 | Shi et al. |
| 2020/0327340 A1 | 10/2020 | Jackobson |
| 2020/0334930 A1* | 10/2020 | Masood ................ G07C 9/257 |
| 2021/0067521 A1 | 3/2021 | Shannon et al. |
| 2021/0112373 A1 | 4/2021 | Pazhyannur |

* cited by examiner

SYSTEMS AND METHODS FOR MAPPING INDOOR USER MOVEMENT USING A COMBINATION OF WI-FI AND 60 GHz SENSING

PRIORITY

This application is a continuation under 35 U.S.C. § 120 of U.S. patent application Ser. No. 16/878,813 filed May 20, 2020, which is a utility filing entitled "Systems and Methods for Mapping Indoor User Movement Using a Combination of Wi-Fi and 60 GHZ Sensing," which claims priority to U.S. provisional Application No. 62/914,177 filed Oct. 11, 2019, which is hereby incorporated by reference in its entirety.

TECHNICAL FIELD

The present disclosure generally relates to mapping user movement, and more specifically to systems and method for mapping indoor user movement using a combination of Wi-Fi and 60 GHz sensing.

BACKGROUND

Wireless networking, also called Wi-Fi or 802.11 networking, uses radio signals to wirelessly connect devices such as computers, phones, and tablets to the Internet at high speeds in homes, businesses, and public spaces. The Institute of Electrical and Electronics Engineers ("IEEE") wireless standard 802.11ax (referred to herein as "11ax"), marketed as Wi-Fi 6, is one of the next mainstream protocols in Wi-Fi technology. Another wireless standard is 802.11ay ("11ay"). While 11ax operates at low frequency bands, such as the 2.4 GHz and 5 GHz bands, and can penetrate walls and other physical barriers, 11ay operates at the higher 60 GHz band, and cannot effectively penetrate walls.

DESCRIPTION OF EXAMPLE EMBODIMENTS

Overview

Figure 1:
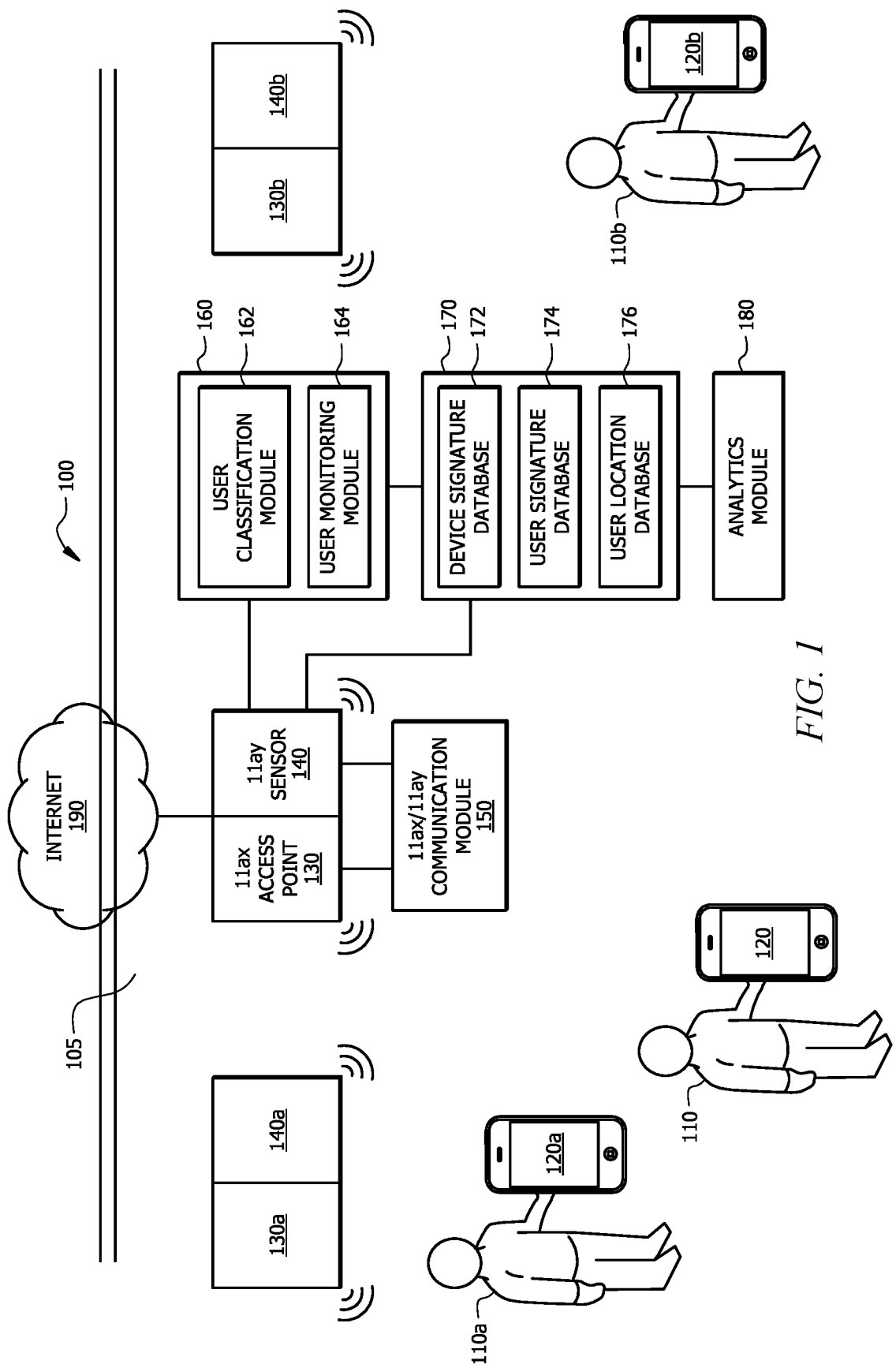
FIG. 1 illustrates a system for mapping indoor user movement using a combination of Wi-Fi and 60 GHz sensing, in accordance with certain embodiments.

According to an embodiment, a system may include one or more processors and one or more computer-readable non-transitory storage media comprising instructions that, when executed by the one or more processors, cause one or more components of the system to perform operations including, detecting, via a Wi-Fi access point, a wireless device associated with a first user, wherein the Wi-Fi access point is one of a plurality of Wi-Fi access points and is configured to determine location information and a device signature associated with the wireless device; transmitting the location information of the wireless device to a 11ay sensor, wherein the 11ay sensor is one of a plurality of 11ay sensors; detecting the first user, via the 11ay sensor, based on the location information of the wireless device; creating a user signature associated with the first user, wherein the user signature is based on one or more physical characteristics of the first user detected by the 11ay sensor; and using the device signature associated with the wireless device and the user signature associated with the first user to subsequently identify the first user.

Moreover, the location information may include one or more location coordinates of the wireless device.

Additionally, the operations may further include storing the location information, the device signature, and the user signature in one or more databases associated with the plurality of 11ay sensors.

Further, the plurality of 11ay sensors may be configured to continuously detect a plurality of users based on a plurality of location information associated with a plurality of wireless devices, the plurality of location information transmitted to the plurality of 11ay sensors by the plurality of access points.

Additionally, the operations may further include subsequently detecting the first user based on a subsequent location information of the wireless device associated with the first user; and identifying the first user as a previously detected user based on the user signature and the device signature stored in the one or more databases. The operations may also include storing the subsequent location information of the first user in the one or more databases associated with the plurality of 11ay sensors, and mapping a path traversed by the first user based on one or more subsequent location information of the first user.

According to another embodiment, a method may include the steps of detecting, via a Wi-Fi access point, a wireless device associated with a first user, wherein the Wi-Fi access point is one of a plurality of Wi-Fi access points and is configured to determine location information and a device signature associated with the wireless device; transmitting the location information of the wireless device to a 11ay sensor, wherein the 11ay sensor is one of a plurality of 11ay sensors; detecting the first user, via the 11ay sensor, based on the location information of the wireless device; creating a user signature associated with the first user, wherein the user signature is based on one or more physical characteristics of the first user detected by the 11ay sensor; and using the device signature associated with the wireless device and the user signature associated with the first user to subsequently identify the first user.

According to yet another embodiment, one or more computer-readable non-transitory storage media may embody instructions that, when executed by a processor, cause the performance of operations, including detecting, via a Wi-Fi access point, a wireless device associated with a first user, wherein the Wi-Fi access point is one of a plurality of Wi-Fi access points and is configured to determine location information and a device signature associated with the wireless device; transmitting the location information of the wireless device to a 11ay sensor, wherein the 11ay sensor is one of a plurality of 11ay sensors; detecting the first user, via the 11ay sensor, based on the location information of the wireless device; creating a user signature associated with the first user, wherein the user signature is based on one or more physical characteristics of the first user detected by the 11ay sensor; and using the device signature associated with the wireless device and the user signature associated with the first user to subsequently identify the first user.

Technical advantages of certain embodiments of this disclosure may include one or more of the following. The systems and methods described herein may allow for the mapping or monitoring of indoor user movement using a combination of Wi-Fi and 60 GHz sensing. This may be particularly useful in the retail industry, as it may provide insight and analytics on commonly visited areas, user patterns, and the like.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In today's society, where technology is rapidly evolving, most people carry wireless devices that may connect to the Internet using Wi-Fi technology. A Wi-Fi connection may be established through an access point, which is a hardware device or configured node on a local area network (LAN) that allows wireless capable devices and wired networks to connect through a wireless standard, including Wi-Fi. An access point may be mounted on a ceiling and may enable wireless coverage of up to 150 feet indoors and 300 feet outdoors.

Wi-Fi 6 (or 11ax) is a relatively new Wi-Fi standard that was developed to address the growing number of mobile and Internet of Things (IoT) devices accessing a wireless network. To manage this increasing density of devices, 11ax operates on both the 2.4 GHz band and the 5 GHz band, and increases throughput capacity by up to four times that of its precursor, Wi-Fi 5 (or 11ac).

Another Wi-Fi standard, the 11ay (sometimes called "Wi-Gig"), is a companion technology to 11ax . 11ay operates on a higher 60 GHz frequency, has a transmission rate of 20-40 Gbps, and provides coverage of up to 100 feet. 11ay is more affected by weather than the 2.4 GHz and 5 GHz frequencies of 11ax and attenuates rapidly through atmospheric gasses. However, because of the physics of the 60 GHz band, 11ay is limited by physical boundaries, such as walls, furniture and glass, and requires a clear line of sight between the wireless device and the associated access point.

The higher 60 GHz frequency of the 11ay allows for improved location accuracy and a greater ability to pinpoint objects compared to 11ax. This is because the channel bandwidth of the 60 GHz frequency is much higher (typically on the order of 800 MHz or higher) than the 2.4 or 5 GHz frequency of 11ax (which is typically on the order of 20 MHz to 80 MHz). As the channel becomes wider, the ability to detect objects and pinpoint their location improves. As a result, 11ay radios may have radar and sensing capabilities not available in 11ax. In particular, 11ay radios may utilize principles of reflection (which are known in the art) and apply them to Wi-Fi technology to sense/detect objects. Thus, if multiple 11ay radios/sensors are placed in a room, and each is sending radio wave and detecting the reflections which are transmitted back, that data may be used to accurately locate the object in the room, and determine its general size, shape, etc.

FIG. 1 depicts a system 100 for mapping indoor user movement using a combination of 11ax Wi-Fi and 11ay (60 GHz) sensing, according to the present disclosure. Specifically, system 100 may be directed to determining the number of users in a given indoor space 105 (such as a mall, retail space, or other venue), as well as, for a given user, determining the path traversed by that user in the given indoor space. The path of the user may be mapped and his/her movement determined by a combination of Wi-Fi association and 11ay radio sensing, as described herein.

System 100 may include at least one Wi-Fi access point 130 and at least one 11ay 60 GHz radio 140 having sensing capabilities mounted within an indoor space 105. The Wi-Fi access point 130 may operate based on any wireless standard, including 802.11ax, 802.11ac, or any other Wi-Fi technology known in the art. For purposes of illustration, the present disclosure and corresponding FIG. 1 may refer to the Wi-Fi access point 130 as a "11ax access point," but it is to be understood that the present disclosure is not to be so limited and may encompass any type of access point. The 11ay 60 GHz radio 140 will hereinafter be referred to as a "11ay sensor". The 11ax access point 130 and the 11ay sensor 140 may be integrated as a single unit (as shown in FIG. 1), or may be separate devices, mounted in the indoor space 105. The 11ax access point 130 may allow a user 110 to connect his/her wireless device 120 to the Internet 190. The 11ax access point 130 may communicate information to the 11ay sensor via a 11ax communication module 150. Specifically, the communication module 150 may receive information from the 11ax access point 130 and transmit the information to the 11ay sensor 140. In an embodiment, the system 100 may include a plurality of 11ax access points 130a, 130b, and a plurality of 11ay sensors 140a, 140b, mounted in various locations within the indoor space 105. It is to be understood that while the present disclosure describes the functionality and operation of system 100 in connection with 11ax access point 130 and 11ay sensor 140, the described concepts may apply to the plurality of 11ax access points 130, 130a, 130b, and the plurality of 11ay sensors 140, 140a, 140b. It is further to be understood that while FIG. 1 will generally be described in connection with one wireless device 120 associated with one user 110, system 100 of the present disclosure is configured to detect a plurality of wireless devices 120, 120a, 120b associated with a plurality of users 110, 110a, 110b.

System 100 may further include one or more modules 160 and one or more databases 170 communicably coupled to the plurality of 11ay sensors 140, 140a, 140b. In particular, the system 100 may include a user classification module 162 for creating a user signature, and a user monitoring module 164 for determining whether a user has been previously detected by an 11ay sensor 140, 140a, 140b, as described more fully below. The system may further include one or more databases 170 for storing information relating to system 100, including a device signature database 172, a user signature database 174, and a user location database 176. Finally, system 100 may include an analytics module 180 for mapping locations of the user 110. For purposes of illustration, FIG. 1 shows the one or more modules 160, the one or more databases 170, and the analytics module 180 communicably coupled to the 11ay sensor 140, but it is to be understood that the one or more modules 160, the one or more databases 170, and the analytics module 180 may be associated with the plurality of 11ay sensors 140, 140a, 140b.

In an embodiment, certain functions described in FIG. 1 and related to the plurality of 11ax access points 130, 130a, 130b, the plurality of 11ay sensors 140, 140a, 140b, the one or more modules 160 (including user classification module 162 and user monitoring module 164), the one or more databases 170 (including device signature database 172, user signature database 174, and user location database 176), and the analytics module 180 may be controlled, managed, or otherwise initiated by one or more controllers, processors, components, or devices (not shown).

In operation, the 11ax access point 130 may detect a wireless device 120 associated with a first user 110 based on Wi-Fi association. In particular, the process of detecting the wireless device 120 may include authenticating and then associating (registering) the wireless device 120 with the 11ax access point 130 to enable the wireless device 120 to access the Internet 190. The wireless infrastructure may allow the 11ax access point 130 to further determine location information of the wireless device 120. Location information may be in the form of one or more location coordinates of the wireless device 120. In an embodiment, location information may include (x, y, z) coordinates having a degree of uncertainty (delineated by +/− delta x, +/− delta y, +/− delta z). The degree of uncertainty may indicate an x-, y-, and z-coordinate range, resulting in the formation of a cube or sphere within which the wireless device 120 is located. Depending on the Wi-Fi technology that is being utilized, that degree of uncertainty may be high, e.g., 10 or more feet. Because, in typical scenarios, the user 110 is carrying his/her wireless device 120, the location information of the wireless device 120 may provide a general estimate of the location of the user 110.

The 11ax access point 130 may also be configured to determine a device signature associated with the detected wireless device 120. The device signature may include one or more of the following: the media access control (MAC) address associated with the wireless device 120, the device-type (iPhone, Android, etc.), the device name (e.g., the user assigned to the device), and the like.

Next, the 11ax access point 130 may transmit the location information and the device signature of the wireless device 120 to the 11ay sensor 140 via the 11ax/11ay communication module 150. The 11ay sensor 140 may use the location information to detect the user 110. In an embodiment, using the location information of the wireless device 120 provided by the 11ax access point 130, the 11ay sensor may focus in to the particular x, y, and z coordinates to detect the user 110. By "detecting" the user 110, the system is not determining the identity of the user 110, but rather, by using principles of radio sensing and reflection, may determine the existence of the user 110 in the physical location indicated by the location information, and may determine certain physical characteristics of the user 110. The detected physical characteristics may include, by way of example, the height of the user, the length of the user's face, the length of the user's limbs, the user's foot length, the user's stride, etc.

One or more physical characteristics of the user 110, as detected by the 11ay sensor 140, may be transmitted to a user monitoring module 164. The user monitoring module 164 may determine whether the presently-detected user 110 has been previously detected by any of the plurality of 11ay sensors 140, 140a, 140b. The user monitoring module 164 may make this determination by checking the user signature database 174 of the one or more databases 170 to see whether there is a user signature associated with the physical characteristics of the presently detected user 110. If there is no existing user signature for the user 110, the user monitoring module 164 may instruct the user classification module 162 to a create a user signature for this particular user 110. Specifically, the user classification module 162 may process the physical characteristics transmitted by the 11ay sensor 140 to create a user signature associated with the user 110. The user signature may be specifically based on the detected physical characteristics of the user 110.

The device signature and location information associated with the wireless device 120, and the user signature associated with the user 110, may be stored in one or more databases 170 associated with the plurality of 11ay sensors 140, 140a, 140b. By way of example, the device signature of the wireless device 120 may be stored in the device signature database 172, the location information may be stored in user location database 176, and the user signature may be stored in user signature database 174. The address locations of the device signature, location information, and user signature for a particular user 110 and/or his/her associated wireless device 120 may be mapped in the one or more databases 170, so that the device signature, location information, and user signature for a particular user 110 may be easily correlated. The device signature and the user signature may be used to subsequently identify the user 110 as he/she moves throughout the indoor space 105.

The plurality of 11ax access points 130, 130a, 130b and the plurality of 11ay sensors 140, 140a, 140b may be configured to continuously monitor and detect a plurality of wireless devices 120, 120a, 120b and an associated plurality of users 110, 110a, 110b, respectively, traveling or moving within the indoor space 105. Specifically, each time a 11ax access point 130, 130a, 130b detects a wireless device 120, 120a, 120b associated with a user 110, 110a, 110b, the access point 130, 130a, 130b may determine location information associated with that wireless device 120, 120a, 120b and transmit it to an associated 11ay sensor 140, 140a, 140b via an 11ax/11ay communication module (such as module 150 shown in FIG. 1). The associated 11ay sensor 140a, 140a, 140b may use the location information to detect the user 110, 110a, 110b and create a user signature. Then, the location information, device signature, and user signature may be stored in the one or more databases 170, as described above. In this manner, the plurality of 11ay sensors 140, 140a, 140b may be configured to detect a plurality of users 110, 110a, 110b based on a plurality of location information associated with a plurality of wireless devices 120, 120a, 120b, wherein the plurality of location information is transmitted to the plurality of 11ay sensors 140, 140a, 140b by the plurality of 11ax access points 130, 130a, 130b. It is to be understood that the plurality of 11ay sensors 140, 140a, 140b may be communicatively coupled to user classification module 162, user monitoring module 164, one or more databases 170, including devices signature database 172, user signature database 174, and user location database 176.

As the plurality of 11ay sensors 140, 140a, 140b are continuously monitoring and detecting users 110, 110a, 110b, the user 110 (who has been previously detected by an 11ay sensor 140) may be subsequently detected by another 11ay sensor 140a, 140b based on subsequent location information of the wireless device 120 transmitted by another 11ax access point 130a, 130b. More specifically, a 11ax access point 130a, 130b may detect the wireless device 120 of the user 110 in a subsequent location, determine the device signature and subsequent location information associated with the wireless device 120, and transmit the device information and subsequent location information to an associated 11ay sensor 140a, 140b via a 11ax/11ay communication module (such as module 150). The 11ay sensor 140a, 140b may then detect the user 110 based on the subsequent location information, in the manner described above (e.g., by determining the existence of the user 110 in the subsequent location indicated by the subsequent location information, and determining certain physical characteristics of the user 110 using sensing and reflection principles known in the art).

Using the information (physical characteristics) detected by the 11ay sensor 140a, 140b, the user monitoring module 164 may then determine whether the detected user 110 corresponds to an existing user signature stored in the user signature database 174 of the one or more databases 170. If a match is found, the user monitoring module 164 may further determine whether the device signature provided by the 11ax access point 130a, 130b matches an existing device signature stored in the device signature database 172 which is mapped to the existing user signature. Thus, using these two signatures, the system 100 may determine whether this user 110 (and his/her wireless device 120) was previously detected. If there is a match with an existing user signature and a corresponding device signature, the system 100 may identify the user 110 as a "known" user (a user that has been previously detected), and the subsequent location information of the user 110 may be stored in the user location database 176 of the one or more databases 170.

Because the indoor space 105 may have a plurality of 11ax access points 130, 130a, 130b and a plurality of 11ay sensors 140, 140a, 140b strategically positioned at certain entrances, doorways, points of access, etc. (the plurality of 11ax access points 130, 130a, 130b and the plurality of 11ay sensors 140, 140a, 140b configured to continuously scan and detect wireless devices and users), each time a given user 110 is detected by an 11ay sensor 140, 140a, 140b, his/her subsequent location information may be stored and tracked in the user location database 176. The system 100 may then use this information to map the path traversed by the user 110 within the indoor space 105.

An analytics module 180 may use the location information stored in the user location database 176 to provide data analytics, which analyze trends, identify patterns, draw inferences, provide recommendations, etc. For example, if the indoor space 105 is a retail mall, the information may be used to identify patterns and trends regarding shopping (e.g., whether and what percentage of shoppers of athletic apparel also shop for sports and recreation items, whether there is a pattern of shoppers visiting in a first retail store also visit a particular second retail store, etc.)

Figure 2:
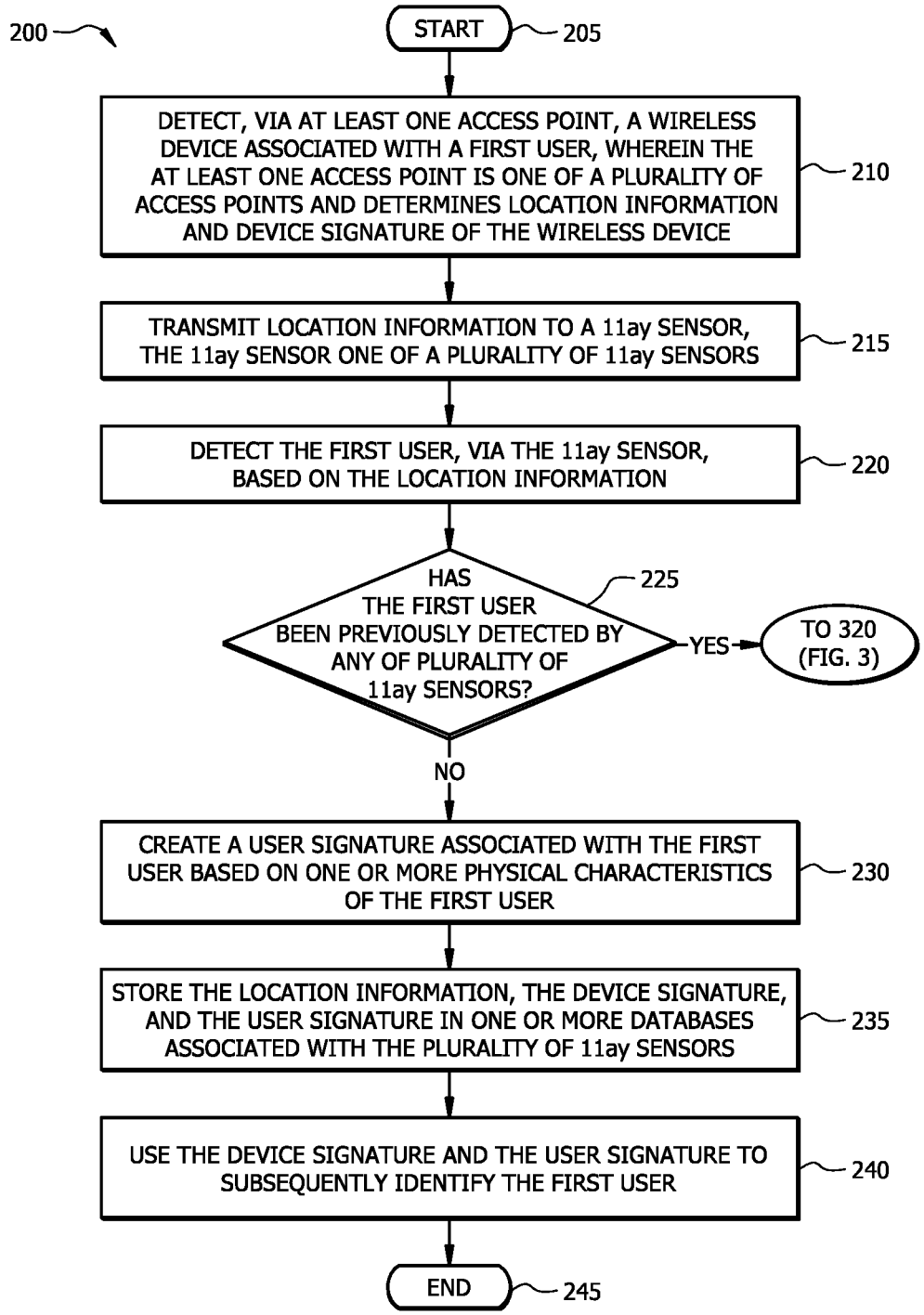
FIG. 2 illustrates a flow diagram of a method for identifying a user using a combination of Wi-Fi and 60 GHz sensing, in accordance with certain embodiments.
Figure 3:
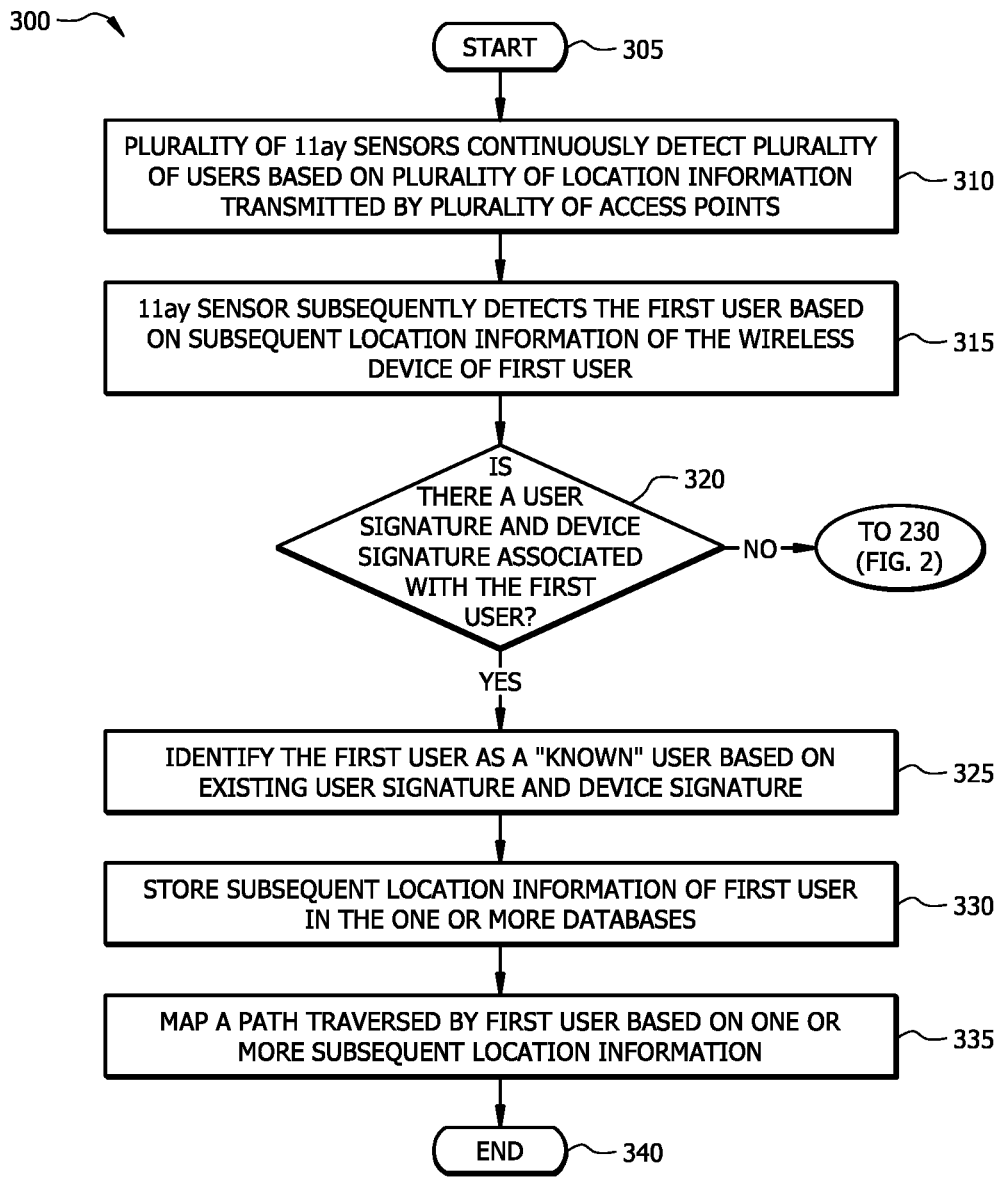
FIG. 3 illustrates a flow diagram of a method for mapping the movement of a user using a combination of Wi-Fi and 60 GHz sensing, in accordance with certain embodiments.

Reference is now made to FIGS. 2 and 3, wherein are shown methods for monitoring the movement of a user using a combination of Wi-Fi and 11ay sensing. Method 200 is directed to the first detection of a user using a combination of Wi-Fi and 11ay sensing, and method 300 is directed to a subsequent detection and mapping of the movement of the user in an indoor space using a combination of Wi-Fi and 11ay sensing. Method 200 may begin at step 205.

At step 210, at least one Wi-Fi access point may detect a wireless device associated with a first user based on Wi-Fi association. In an embodiment, the Wi-Fi access point may be a 802.11ax access point. In another embodiment, the Wi-Fi access point may be a 802.11ac access point, or any other Wi-Fi access point known in the art. The Wi-Fi access point may be one of a plurality of Wi-Fi access points in the indoor space and may determine the location information and the device signature of the wireless device. In particular, the process of detecting the wireless device may include authenticating and then associating (registering) the wireless device with the Wi-Fi access point to enable the wireless device to access the Internet. The wireless infrastructure may allow the Wi-Fi access point to further determine location information of the wireless device. Location information may be in the form of one or more location coordinates of the wireless device. In an embodiment, location information may include (x, y, z) coordinates having a degree of uncertainty (delineated by +/− delta x, +/− delta y, +/− delta z). The degree of uncertainty may indicate an x-, y-, and z-coordinate range, resulting in the formation of a cube or sphere within which the wireless device is located. Because the first user is likely carrying the wireless device, the location information of the wireless device may provide a focused estimate of the location of the first user.

The Wi-Fi access point may also be configured to determine a device signature associated with the detected wireless device. The device signature may include one or more of the following: the MAC address associated with the wireless device, the device-type (iPhone, Android, etc.), the device name (e.g., the user assigned to the device), and the like.

At step 215, the location information may be transmitted to a 11ay sensor by the Wi-Fi access point. The 11ay sensor may be one of a plurality of 11ay sensors. In an embodiment, the Wi-Fi access point and the 11ay sensor may be integrated as a single unit. In another embodiment, the Wi-Fi access point and the 11ay sensor may be separate devices, mounted in the indoor space. At step 220, the 11ay sensor may detect the first user based on the location information transmitted by the Wi-Fi access point. By "detecting" the first user, the identity of the first user is not detected, but rather, by using known principles of radio sensing and reflection, the existence of the user may be detected in the location indicated by the location information, and certain physical characteristics of the user may be determined. The detected physical characteristics may include, by of example, the height of the user, the length of the user's face, the length of the user's limbs, the user's foot length, the user's stride, etc.

At step 225, a determination made be made as to whether the first user has been previously detected by any of the plurality of 11ay sensors. This determination made be based on the existence of a user signature corresponding to the detected physical characteristics of the first user in one or more databases associated with the plurality of 11ay sensors. If, at step 225, it is determined that the first user has not been previously detected by any of the plurality of 11ay sensors, the method may proceed to step 230, wherein a user signature associated with the first user may be created. The user signature may be based on one or more physical characteristics of the first user detected by the 11ay sensor. At step 235, the location information, the device signature, and the user signature may be stored in one or more databases associated with the plurality of 11ay sensors. At step 240, the device signature and the user signature may be used to subsequently identify the first user (as described more fully in conjunction with FIG. 3). At step 245, the method may end.

If, at step 225, it is determined that the first user has been previously detected by any of the plurality of 11ay sensors, the method may proceed to step 320 of FIG. 3, which will be described below.

Reference is now made to FIG. 3, wherein in shown method 300 for subsequent detection of the first user using a combination of Wi-Fi and 11ay sensing. Method 300 is a continuation of method 200 described above in conjunction with FIG. 2. The method may begin at step 305. At step 310, the plurality of 11ay sensors is configured to continuously monitor and detect a plurality of users based on a plurality of location information associated with a plurality of wireless devices, the plurality of location information transmitted to the plurality of 11ay sensors by the plurality of Wi-Fi access points. Specifically, each time a Wi-Fi access point (from the plurality of Wi-Fi access points) detects a wireless device (from a plurality of wireless devices) associated with a user (from a plurality of users), the Wi-Fi access point may determine location information associated with that wireless device and transmit it to an associated 11ay sensor. The associated 11ay sensor may use the location information to detect the user and create a user signature. Then, the location information, device signature, and user signature may be stored in the one or more databases, as described above.

At step 315, an 11ay sensor from the plurality of 11ay sensors may detect the first user based on subsequent location information of the wireless device of the first user. More specifically, a Wi-Fi access point may detect the wireless device of the first user in a subsequent location, determine the device signature and location information associated with the wireless device, and transmit the device information and subsequent location information to an associated 11ay sensor. The 11ay sensor may then detect the first user based on the subsequent location information, in the manner described above (e.g., by determining the existence of the first user in the subsequent location indicated by the subsequent location information, and determining certain physical characteristics of the first user using sensing and reflection principles known in the art).

At step 320, a determination is made as to whether the detected first user corresponds to an existing user signature stored in the one or more databases. This determination may be made by checking the one or more databases to see whether there is an existing user signature matching the physical characteristics of the presently-detected first user. This determination may also include determining whether the device signature provided by the Wi-Fi access point matches an existing device signature stored in the one or more databases and mapped to the existing user signature.

If, at step 320, it is determined that detected first user does not correspond to an existing user signature stored in the one or more databases, the method may proceed to step 230 of FIG. 2 wherein a user signature associated with the first user may be created. If, however, if it is determined that detected first user corresponds to an existing user signature stored in the one or more databases, the method may proceed to step 325, wherein the first user is identified as "known" user (a user that has previously been detected) based on the user signature and device signature.

At step 330, the subsequent location information may be stored in the one or more databases associated with the plurality of 11ay sensors. At step 335, a path traversed by the first user may be mapped based on one or more subsequent location information of the first user. In other words, each time a Wi-Fi access point (of the plurality of Wi-Fi access points) in combination with a 11ay sensor (of the plurality of 11ay sensors) detects the first user, that location information may be stored and mapped, essentially creating a time series for the first user and identifying the path traversed.

In an embodiment, certain functions, processes, and steps described in FIGS. 2 and 3 may be controlled, managed, or otherwise initiated by one or more controllers, processors, components, or devices, as described above in conjunction with FIG. 1.

While FIGS. 1-3 have been described in conjunction with the mapping of user (human) movement, it is to be understood that the principles and concepts described in the present disclosure may be used to map, monitor, track, and/or locate devices, objects, pets, and other non-human subjects. In essence, and as described above, the object may be detected via Wi-Fi access points, and 11ay sensors may be used to refine or determine more precise location of that object. In an embodiment, this may allow for fine tune detection of a user device (whether in hands, front pocket, back pocket, user displacement, etc.)

Figure 4:
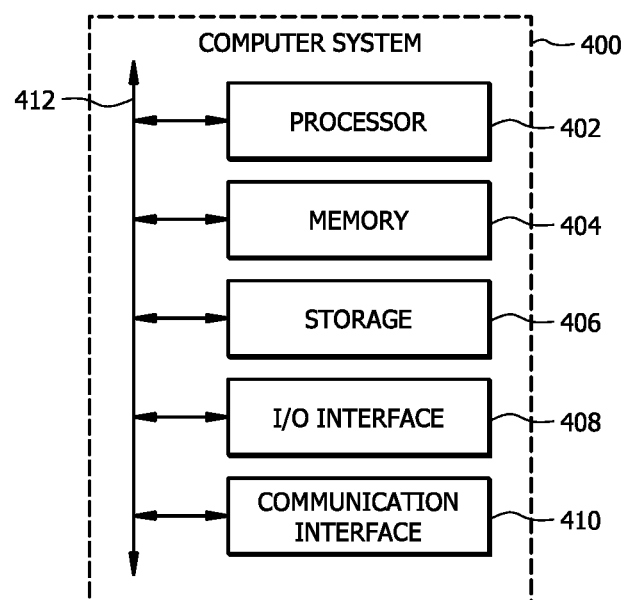
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
   one or more processors; and
   one or more computer-readable non-transitory storage media comprising instructions that, when executed by the one or more processors, cause one or more components of the system to perform operations comprising:
   detecting, by a Wi-Fi device and using Wi-Fi sensing on a frequency band below 10 GHz, a wireless device associated with a user and a device signature associated with the wireless device;
   transmitting, by the Wi-Fi device, the device signature to a sensor, wherein the sensor is an 11ay sensor that operates exclusively on a 60 GHz frequency band;
   determining, by the sensor and using principles of radio sensing and reflection, physical characteristics of the user;
   determining, based at least in part on the detected physical characteristics of the user, whether the user was previously detected by at least one of a plurality of sensors;
   creating, in response to determining that the user was not previously detected by the at least one of the plurality of sensors, a user signature associated with the user, wherein the user signature is based on one or more of the physical characteristics of the user; and
   using the device signature associated with the wireless device and the user signature associated with the user to identify the user.

2. The system of claim 1, wherein the device signature comprises one or more of the following:
   a media access control (MAC) address associated with the wireless device;
   a type of the wireless device; and
   a name of the wireless device.

3. The system of claim 1, the operations further comprising storing the device signature and the user signature in one or more databases associated with the sensor.

4. The system of claim 1, wherein the physical characteristics of the user comprise one or more of the following:
a height of the user;
a length of a face of the user;
a length of a limb of the user;
a length of a foot of the user; and
a stride of the user.

5. The system of claim 1, wherein the Wi-Fi device and the sensor are integrated as a single unit.

6. The system of claim 1, wherein:
the Wi-Fi device and the sensor are mounted in an indoor space; and
the device signature and the user signature are further used to subsequently identify the user as the user moves throughout the indoor space.

7. The system of claim 1, wherein the Wi-Fi device and the sensor are configured to continuously monitor and detect a plurality of wireless devices and an associated plurality of users.

8. A method, comprising:
detecting, by a Wi-Fi device and using Wi-Fi sensing on a frequency band below 10 GHz, a wireless device associated with a user and a device signature associated with the wireless device;
transmitting, by the Wi-Fi device, the device signature to a sensor, wherein the sensor is an 11ay sensor that operates exclusively on a 60 GHz frequency band;
determining, by the sensor and using principles of radio sensing and reflection, physical characteristics of the user;
determining, based at least in part on the detected physical characteristics of the user, whether the user was previously detected by at least one of a plurality of sensors;
creating, in response to determining that the user was not previously detected by the at least one of the plurality of sensors, a user signature associated with the user, wherein the user signature is based on one or more of the physical characteristics of the user; and
using the device signature associated with the wireless device and the user signature associated with the user to identify the user.

9. The method of claim 8, wherein the device signature comprises one or more of the following:
a media access control (MAC) address associated with the wireless device;
a type of the wireless device; and
a name of the wireless device.

10. The method of claim 8, further comprising storing the device signature and the user signature in one or more databases associated with the sensor.

11. The method of claim 8, wherein the physical characteristics of the user comprise one or more of the following:
a height of the user;
a length of a face of the user;
a length of a limb of the user;
a length of a foot of the user; and
a stride of the user.

12. The method of claim 8, wherein the Wi-Fi device and the sensor are integrated as a single unit.

13. The method of claim 8, wherein the Wi-Fi device and the sensor are mounted in an indoor space.

14. The method of claim 8, wherein the Wi-Fi device and the sensor are configured to continuously monitor and detect a plurality of wireless devices and an associated plurality of users.

15. One or more computer-readable non-transitory storage media embodying instructions that, when executed by a processor, cause performance of operations comprising:
detecting, by a Wi-Fi device and using Wi-Fi sensing on a frequency band below 10 GHz, a wireless device associated with a user and a device signature associated with the wireless device;
transmitting, by the Wi-Fi device, the device signature to a sensor, wherein the sensor is an 11ay sensor that operates exclusively on a 60 GHz frequency band;
determining, by the sensor and using principles of radio sensing and reflection, physical characteristics of the user;
determining, based at least in part on the detected physical characteristics of the user, whether the user was previously detected by at least one of a plurality of sensors;
creating, in response to determining that the user was not previously detected by the at least one of the plurality of sensors, a user signature associated with the user, wherein the user signature is based on one or more of the physical characteristics of the user; and
using the device signature associated with the wireless device and the user signature associated with the user to identify the user.

16. The one or more computer-readable non-transitory storage media of claim 15, wherein the device signature comprises one or more of the following:
a media access control (MAC) address associated with the wireless device;
a type of the wireless device; and
a name of the wireless device.

17. The one or more computer-readable non-transitory storage media of claim 15, the operations further comprising storing the device signature and the user signature in one or more databases associated with the sensor.

18. The one or more computer-readable non-transitory storage media of claim 15, wherein the physical characteristics of the user comprise one or more of the following:
a height of the user;
a length of a face of the user;
a length of a limb of the user;
a length of a foot of the user; and
a stride of the user.

19. The one or more computer-readable non-transitory storage media of claim 15, wherein the Wi-Fi device and the sensor are integrated as a single unit.

20. The one or more computer-readable non-transitory storage media of claim 15, wherein the Wi-Fi device and the sensor are mounted in an indoor space.

* * * * *